Dec. 13, 1949 A. M. BARRETT 2,491,073
PALLET SKID
Filed Nov. 23, 1945 2 Sheets-Sheet 2
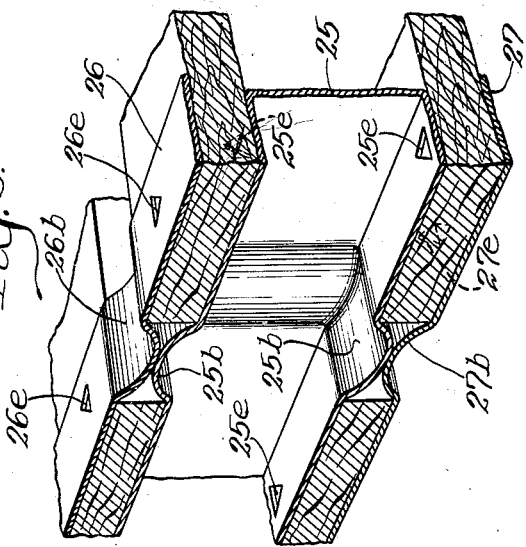
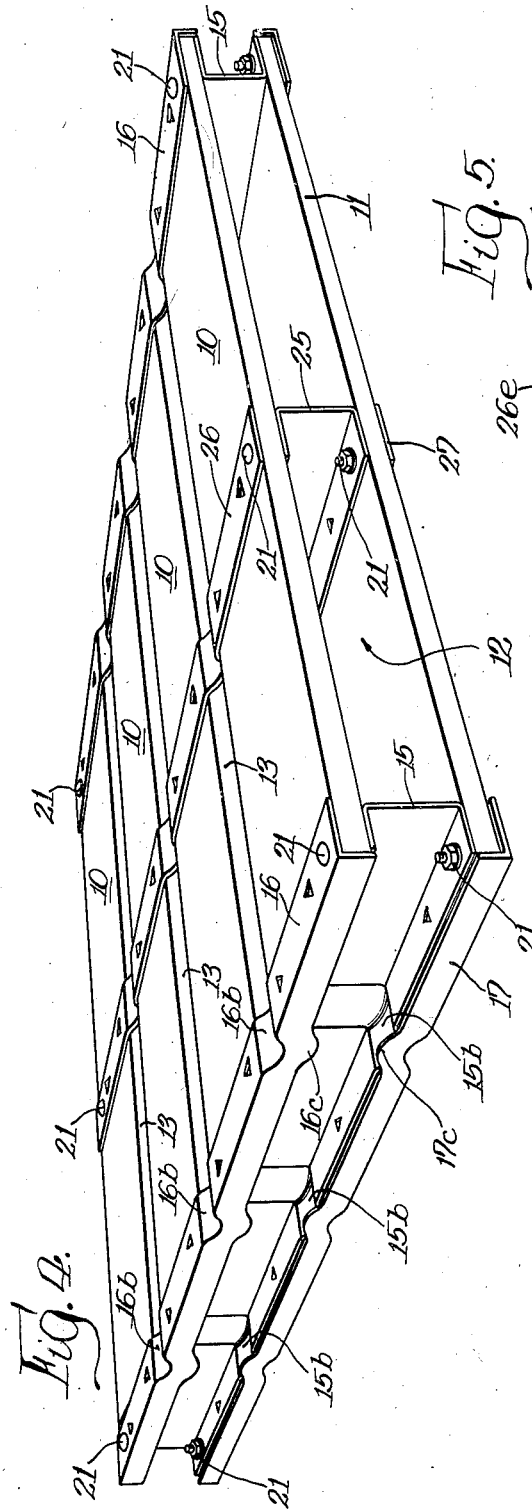
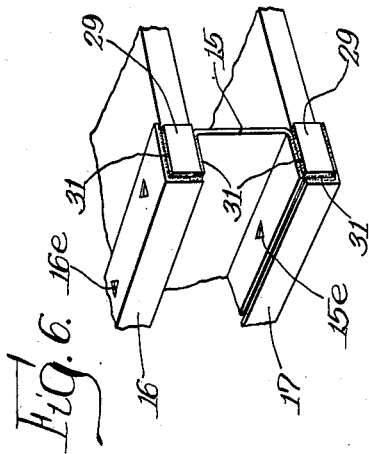
INVENTOR.
Arthur M. Barrett,
BY
Brown, Jackson, Boettcher & Dienner
Attys.

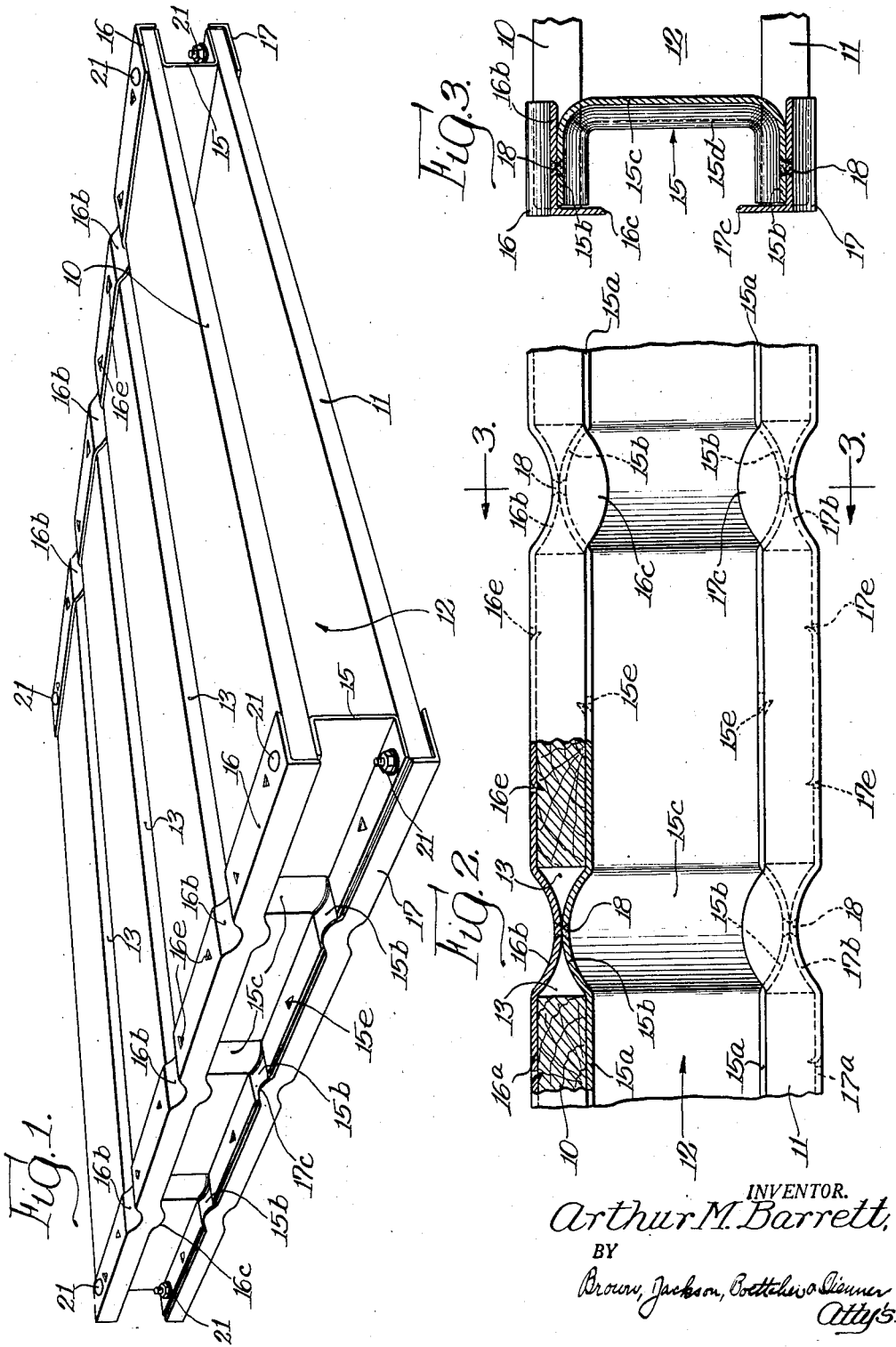

Patented Dec. 13, 1949

2,491,073

UNITED STATES PATENT OFFICE 2,491,073

PALLET SKID

Arthur M. Barrett, Winnetka, Ill., assignor to Barrett-Cravens Company, Chicago, Ill., a corporation of Illinois Application November 23, 1945, Serial No. 630,382

13 Claims. (Cl. 248—120)

The present invention relates to pallet skids such as are used in conjunction with fork trucks and pallet lift trucks for load carrying and load tiering purposes. These pallet skids differ from conventional lift truck skids in that they have two vertically spaced layers or tiers of boards instead of just one upper layer of boards, the bottom layer of boards affording a supporting surface for double tiering the load, as is well understood by those skilled in the art.

One of the objects of the present invention is to provide an improved pallet skid of the above type which is steel-bound, i. e., which is reinforced and protected by structural steel bars.

Another object of the invention is to provide a pallet skid of the above general description in which the vertical spacing between the upper and lower layers of the boards, and the lateral spacing between adjacent boards, is maintained by an improved arrangement of channel bars and angle bars uniquely welded together in the lateral spaces between the boards.

Another object of the invention is to provide a pallet skid of the above general description which is simple and inexpensive to construct.

Other objects, features and advantages of the invention will appear from the following detailed description of certain preferred embodiments of the invention. In the accompanying drawings illustrating such embodiments:

Figure 1 is a diagonal perspective view of one embodiment of the invention, viewed from one corner of the skid;

Figure 2 is a fragmentary view, partly in section, showing the manner of securing the channel bars and angle bars together;

Figure 3 is a transverse detail sectional view taken approximately on the plane of the line 3—3 of Figure 2;

Figure 4 is a perspective view similar to Figure 1, but illustrating a modified construction having a central reinforcing channel extending between the upper and lower layers of boards;

Figure 5 is a fragmentary detail section showing the manner of joining this central channel to the upper and lower strap bars of this construction; and Figure 6 is a fragmentary perspective view showing another modified construction.

Referring first to Figures 1, 2 and 3, the upper layer of boards is indicated at 10 and the lower layer of boards is indicated at 11, these two layers or tiers being vertically separated a sufficient distance to provide an intervening space 12 which will accommodate a pallet lift truck or the forks of fork trucks. The lateral edges of adjacent boards of each layer are separated by a space indicated at 13.

Each side edge of the skid is built up of channel bars 15 and upper and lower angle bars 16 and 17. In the assembled relation of the parts the channel bars 17 extend across each side of the pallet skid, spacing the ends of the top boards from the ends of the lower boards 11. In this assembled relation, the upper angle bars 16 extend over and protect the ends of the upper boards 10, and the lower angle bars 17 likewise extend over and protect the ends of the lower boards 11. Prior to the assembly of the skid, the channels 15 and the angle bars 16 and 17 are subjected to preliminary forming and punching operations which produce the formations illustrated to best advantage in Figures 2 and 3. For example, the upper and lower flanges 15a of the channels 15 have humps or corrugations 15b punched therein at intervals. These humps are punched in an outward direction, i. e., the humps in the upper flange 15a bowing upwardly in a direction away from the channel web, and the humps in the lower flange 15a bowing downwardly in a direction away from the channel web. Preferably, the humps or corrugations 15b in the flanges of each channel may be joined coextensively by forming similar humps or corrugations 15c extending vertically through the web 15d of each channel bar, these vertical humps extending in a direction away from the flange side of the channel or inwardly with respect to the finished skid, as shown in Figure 3. These vertical humps 15c are not essential and can be dispensed with, if desired. Correspondingly, the horizontal flange 16a of each upper angle bar 16 is formed with downwardly extending humps 16b adapted to match with the adjacent humps 15b in the upper flange of the channel bar, and the horizontal flanges 17a of the lower angle bars 17 are formed with upwardly extending humps 17b adapted to match with the downwardly extending humps 15b in the lower flange of the channel bar. These matching humps 15b, 16b and 17b are formed at such intervals of spacing along the lengths of their respective bars that they occur or match with the lateral spaces 13, 13 between the lateral edges of the upper and lower boards. As shown in Figure 1, the punching of the depressions or humps 16b and 17b in the horizontal flanges of the angle bars results in the metal in each vertical flange of each angle bar being displaced downwardly in the form of a hump, as indicated at 16c and 17c.

In addition to these humps or corrugations, the channel bars and angle bars are both formed with locking spurs which penetrate the inner and outer surfaces of the boards 10, 11 for locking the boards against endwise separation from the structural bars. The spurs 15e, which are punched from the channel bar 15, consist of small pointed tongues of metal punched upwardly and downwardly respectively from the upper and lower flanges 15a of the channel, as clearly shown in Figure 2. The spurs 16e and 17e which are punched from the angle bars likewise consist of pointed tongues of metal which are punched downwardly from the flange 16a of the upper angle bar, and upwardly from the flange 17a of the lower angle bar.

In the assembly of the skid, pressure is brought to bear between the structural bars 15, 16 and 17 and the boards 10 and 11 in such direction as to force the locking spurs 15e, 16e and 17e into the wood. This may be done in step-by-step sequence with the progressive assembly of the construction, viz., first after the lower boards are laid on the lower angle 17, then after the channel 15 is laid on the lower boards, etc.; or alternatively, the assembly may be completed before the pressure is brought to bear on the structural bars for forcing the locking spurs into the wood. After this much of the assembly has been completed, the cooperating humps or corrugations 15b, 16b, and 17b of the channel and angle bars are welded together. As shown in Figure 2, the depth of these humps is such as to bring their convex surfaces into actual or approximate contact, and the weld is performed at these points of actual or proximate contact, the weld being diagrammatically indicated at 18. This may be either a spot welding operation, or a flash welding operation, or any other preferred type of welding operation. As a result of these welding operations the three structure bars 15, 16, and 17 along each side edge of the skid become an integrally joined structure which will not become loosened as a result of vibration or stress. This integrally joined structure 15, 16, 17 is rigidly locked to the ends of the boards 10, 11 by the spurs 15e, 16e, and 17e. In addition, this integrally joined structure 15, 16, 17 positively maintains the desired spaced relation between the lateral edges of both tiers of boards. Because the end boards of each series do not have the benefit of humps or corrugations in the structural bars for preventing outward displacement of these end boards, it may be desirable in some instances to pass bolts 21 through the corners of the skid at the top and bottom. These bolts 21 would pass through the horizontal flanges of the upper and lower angle bars, and through the end portions of the boards, and would then pass through the upper and lower flanges of the channel bar 15. Rounded outer heads on the bolts would present a substantially flush outer surface, and the nuts of said bolts would be disposed within the confines of the channel where they could not do damage to adjacent surfaces. As indicated above, the use of these bolts 21 is optional, but it may be desirable to employ them in the larger or heavier pallet skids.

Referring now to the modified construction illustrated in Figures 4 and 5, this construction is centrally reinforced by extending a channel bar 25 down through the center of the skid, this channel bar being secured to cooperating strap bars 26 and 27 extending across the upper and lower sides of the skid, parallel with the channel bar. The channel bar 25 may be a substantial duplication of each of the side channel bars 15, having the spaced humps 15b projecting upwardly from its upper flange and downwardly from its lower flange in substantially the same arrangement previously described in connection with Figure 2. This channel bar 25 also has spurs 25e punched upwardly and downwardly from its upper and lower flanges, as described above in connection with channel bars 15, these spurs in the upper flange being shown in dotted lines in Figure 5. The upper and lower strap bars 26 and 27 are of conventional flat bar stock, similar to strap iron. At the intervals corresponding to the spaces 13 between adjacent boards, these strap bars are formed with humps or corrugations 26b and 27b, corresponding to the humps 16b and 17b of the angle irons. Furthermore, these strap bars are formed with locking spurs 26e and 27e, similar to the spurs 16e and 17e. These spurs are pressed into the wood in the same manner described above, and the humps 26b and 27b are also welded to the humps 25b of the channel bar 25 in the same manner described above. Thus, these centrally disposed bars 25, 26 and 27 become united as an integrally joined structure which will not shake apart or become loosened by vibration or load stresses. If desired, bolts 21 may also be passed through the ends of the upper and lower flanges of channel bar 25 and through the upper and lower boards and upper and lower strap bars. This central reinforcing structure 25, 26 and 27 reinforces the central span of the pallet skid, enabling it to carry greater loads. When lifting with a fork truck, the two prongs of the fork pass on opposite sides of the channel bar 25, and, similarly, when lifting with a pallet lift truck the two sides of the U-shaped lifting section pass on opposite sides of the channel 25.

Figure 6 illustrates a modified construction which gives satisfactory corner reinforcement for large size skids without the necessity of applying the bolts 21. In such modified construction, a small closure plate 29 is welded to the adjacent end surfaces of the channel bar 15 and upper and lower angle bars 16 and 17. These closure plates are welded around their perimeters to the horizontal flanges of the channel bar and to both the horizontal and vertical flanges of the angle bars, such welding lines being indicated at 31. Such welding operations are, of course, performed after the assembly of the skid so that the closure plate 29 positively prevents outward displacement of the end boards 10 and 11 from their assembled positions between the channel and angle bars.

When pallet skids of my invention are constructed for use solely in connection with a fork truck, the top and bottom sides of the skid may be symmetrical, and in such cases it will be understood that my previous reference to "upper" and "lower" angle bars, etc., is purely relative, depending upon which side of the skid is uppermost. When constructing the pallet skid of my invention for use in conjunction with a pallet lift truck, it is desirable to provide a substantial space of approximately 6 inches or so, between the two bottom boards 11, 11 at each end of the skid so as to permit the wheels of the lift truck to engage the floor between these end boards. This greater space to accommodate the wheels of the lift truck will be understood by those skilled in the art. Of course, this greater space may also be provided between the end boards in the upper tier 10 as well, so as to make the skid symmetrical and enable either tier of boards to function as the bottom boards.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a pallet skid, the combination of two vertically spaced layers of laterally spaced boards, channel bars vertically spacing said layers along the sides of the skid, angle bars secured to said channel bars over the ends of said boards, and spacing formations projecting from certain of said bars for laterally spacing said boards.

2. In a pallet skid, the combination of upper and lower tiers of laterally spaced parallel boards extending crosswise of the skid, channel bars extending between said upper and lower tiers at the ends of the boards, humps formed in said channel bars serving to laterally spaced said boards and reinforcing bars extending over the outer surfaces of said boards.

3. In a pallet skid, the combination of upper and lower tiers of laterally spaced parallel boards extending crosswise of the skid, channel bars extending between said upper and lower tiers at the ends of the boards, reinforcing bars extending over the outer surfaces of said boards and secured to said channel bars in the spaces between boards, and humps formed in said reenforcing bars serving to laterally space said boards.

4. In a pallet skid, the combination of upper and lower tiers of laterally spaced parallel boards extending crosswise of the skid, channel bars extending between said upper and lower tiers at the ends of the boards, and reinforcing bars extending over the outer surfaces of said boards and welded to said channel bars at points between boards, said welded points also functioning to laterally space said boards.

5. In a pallet skid, the combination of upper and lower tiers of laterally spaced parallel boards extending crosswise of the skid, inner structural bars between said tiers of boards, outer structural bars over the ends of said boards, and humps in said inner and outer structural bars welded together between boards.

6. In a pallet skid, the combination of upper and lower tiers of laterally spaced parallel boards extending crosswise of the skid, channel bars extending between said upper and lower tiers at the ends of the boards, reinforcing bars extending over the outer surfaces of said boards, and humps formed in said channel bars and in said reinforcing bars welded together between boards.

7. In a pallet skid, the combination of upper and lower tiers of parallel boards having their edges laterally spaced, channel bars spacing said upper and lower tiers along the sides of said skid, angle bars extending over the outer surfaces of said boards, locking spurs punched inwardly from the horizontal flanges of said channel bars and from the horizontal flanges of said angle bars and extending into said boards for locking the assembly together, and projections on one set of bars welded to the other set of bars between boards.

8. In a pallet skid, the combination of upper and lower tiers of parallel boards having their edges laterally spaced, channel bars spacing said upper and lower tiers along the sides of said skid, angle bars extending over the outer surfaces of said boards at the ends thereof, spacing formations projecting outwardly from the flanges of said channel bars between boards for spacing the boards, spurs projecting inwardly from said channel bars and from said angle bars and engaging in said boards, and corner bolts extending between said channel bars and said angle bars at the corners of the skid.

9. In a pallet skid, the combination of upper and lower tiers of laterally spaced parallel boards extending crosswise of the skid, spacing means extending between said upper and lower tiers of boards adjacent the ends of said boards, a medial channel bar extending between said upper and lower tiers at a substantially medial point of the skid intermediate the ends of the boards, reinforcing bars extending over the outer surfaces of said boards adjacent said channel bar, and humps in said medial channel bar and in said reinforcing bars serving to laterally space said boards.

10. In a pallet skid, the combination of upper and lower tiers of laterally spaced parallel boards extending crosswise of the skid, channel bars extending between said upper and lower tiers at the ends of the boards, angle bars extending parallel to said channel bars over the ends of the boards, said channel bars and said angle bars having cooperating humps formed therein which are welded together in the lateral spaces between boards, and locking spurs projecting inwardly from the horizontal flanges of said channel bars and said angle bars and engaging in said boards.

11. In a device of the class described, the combination of upper and lower tiers of laterally spaced parallel boards extending crosswise of the skid, channel bars extending between said upper and lower tiers at the ends of the boards, reinforcing bars extending parallel with said channel bars over the ends of said boards, and closure members secured to said bars at the ends thereof for preventing outward displacement of the end boards.

12. In a skid of the class described, the combination of a tier of laterally spaced parallel boards extending crosswise of the skid, channel bars extending along the sides of the skid at the ends of the boards, reinforcing bars extending parallel with said channel bars over the outer surfaces of said boards, and humps in one set of bars welded to the other set of bars.

13. In a skid of the class described, the combination of a tier of laterally spaced parallel boards extending crosswise of the skid, channel bars extending along the sides of the skid at the ends of said boards, angle bars extending parallel with said channel bars and engaging over the ends of said boards, and cooperating humps formed in said channel bars and in said angle bars and welded together between boards.

ARTHUR M. BARRETT.

REFERENCES CITED

The following references are of record in the file of this patent:

UNITED STATES PATENTS

| Number | Name | Date |
| --- | --- | --- |
| 2,148,150 | Clark | Feb. 21, 1939 |
| 2,152,086 | Powell | Mar. 28, 1939 |
| 2,311,280 | Quayle | Feb. 16, 1943 |